US00RE43289E

(19) United States
(12) Reissued Patent
Bowers

(10) Patent Number: US RE43,289 E
(45) Date of Reissued Patent: Apr. 3, 2012

(54) UNI-DIRECTIONAL FLUID VALVE

(75) Inventor: John Lawrence Bowers, Wroclaw (PL)

(73) Assignee: 3M Innovative Properties Company, St. Paul, MN (US)

(21) Appl. No.: 09/986,346

(22) Filed: Nov. 8, 2001

Related U.S. Patent Documents

Reissue of:
(64) Patent No.: 5,687,767
Issued: Nov. 18, 1997
Appl. No.: 08/686,839
Filed: Jul. 26, 1996

U.S. Applications:
(63) Continuation of application No. 09/442,082, filed on Nov. 15, 1999, now Pat. No. Re. 37,974.

(30) Foreign Application Priority Data

Aug. 4, 1995 (GB) ..... 9515986

(51) Int. Cl.
*F16K 15/16* (2006.01)
(52) U.S. Cl. ..... 137/855; 128/205.24; 128/206.15
(58) Field of Classification Search ..... 137/855, 137/856, 857, 858; 128/203.11, 205.24, 128/205.25, 206.15
See application file for complete search history.

(56) References Cited

U.S. PATENT DOCUMENTS

| | | | | |
|---|---|---|---|---|
| 249,557 A | | 11/1881 | Truesdell | |
| 2,105,183 A | | 1/1938 | Cover | |
| 2,112,270 A | * | 3/1938 | Cover | 128/206.15 |
| 2,120,231 A | | 6/1938 | Cover | |
| 2,216,619 A | | 10/1940 | Lehmberg | |
| 2,320,770 A | | 6/1943 | Cover | |
| 2,386,293 A | * | 10/1945 | Clements | 137/858 |
| 2,864,394 A | | 12/1958 | Hempel | |
| 2,874,693 A | | 2/1959 | Matheson | |
| 2,893,387 A | | 7/1959 | Gongoll et al. | |
| 2,895,472 A | | 7/1959 | Matheson | |
| 2,922,380 A | * | 1/1960 | Pedlow, Jr. et al. | 137/855 |
| 2,999,498 A | | 9/1961 | Matheson | |
| 3,191,618 A | | 6/1965 | McKim | |
| 3,276,445 A | | 10/1966 | Langdon | |

(Continued)

FOREIGN PATENT DOCUMENTS

DE 40 29 939 3/1992

(Continued)

OTHER PUBLICATIONS

Moldex's Answer to Second Amended Complaint and Counterclaims (*3M Company and 3M Innovative Properties Company* v. *Moldex-Metric, Inc.*, Civil Action No. 03-5292 MJD/JGL, United States District Court for the District of Minnesota).

(Continued)

*Primary Examiner* — John Rivell
(74) *Attorney, Agent, or Firm* — Karl G. Hanson

(57) ABSTRACT

A uni-directional fluid valve particularly for use as an exhalation valve for a filter mask comprises a flexible flap attached at one end to a concave portion of a seat. The mounting of the flap imparts to it a transverse curvature, stiffening the flap sufficiently for it to remain seated in the absence of a pressure differential across it even when orientated with the seat above the flap.

63 Claims, 3 Drawing Sheets

U.S. PATENT DOCUMENTS

| | | | | | |
|---|---|---|---|---|---|
| 3,295,547 | A | | 1/1967 | Scaramucci | |
| 3,568,712 | A | | 3/1971 | Rinehart | |
| 3,593,732 | A | * | 7/1971 | Holscher | 137/855 |
| 4,414,973 | A | | 11/1983 | Matheson et al. | |
| 4,453,544 | A | | 6/1984 | Silverthorn | |
| 4,456,016 | A | | 6/1984 | Nowacki et al. | |
| 4,630,604 | A | | 12/1986 | Montesi | |
| 4,631,376 | A | | 12/1986 | Leone | |
| 4,749,003 | A | | 6/1988 | Leason | |
| 4,759,758 | A | | 7/1988 | Gabbay | |
| 4,838,262 | A | | 6/1989 | Katz | |
| 4,873,972 | A | | 10/1989 | Magidson et al. | |
| 4,888,009 | A | | 12/1989 | Lederman et al. | |
| 4,934,362 | A | | 6/1990 | Braun | |
| 4,958,633 | A | | 9/1990 | Angell | |
| 4,972,765 | A | | 11/1990 | Dixon | |
| 4,974,586 | A | | 12/1990 | Wandel et al. | |
| 4,981,134 | A | | 1/1991 | Courtney | |
| 5,036,806 | A | | 8/1991 | Rarick | |
| 5,255,687 | A | | 10/1993 | McKenna | |
| 5,295,478 | A | * | 3/1994 | Baldwin | 137/855 |
| 5,325,892 | A | | 7/1994 | Japuntich et al. | |
| 5,331,957 | A | * | 7/1994 | Liu | 128/206.15 |
| 5,346,375 | A | | 9/1994 | Akiyama et al. | |
| 5,509,436 | A | | 4/1996 | Japuntich | |

FOREIGN PATENT DOCUMENTS

| | | | |
|---|---|---|---|
| EP | 0252890 | A1 | 1/1988 |
| EP | 0284353 | A2 | 9/1988 |
| FR | 791607 | | 12/1935 |
| GB | 2 072 516 | | 10/1981 |
| WO | WO 93/24181 | | 9/1993 |

OTHER PUBLICATIONS

Louis M. Gerson Company, Inc.'s Answer and Counterclaims to Plaintiffs' Amended Complaint (*3M Innivative Properties Company and 3M Company* v. *Louis M. Gerson Co., Inc.*, Civil No. 05-CV-26 (MJD/JGL), United States District Court for the District of Minnesota).

Defendant's Supplemental Responses to Plaintiff's Interrogatory Nos. 2, 7-8 and 10 (*3M Company and 3M Innovative Properties Company* v. *Moldex-Metric, Inc.*, Civil Action No. 03-5292 MJD/JGL, United States District Court for the District of Minnesota).

Moldex's Answer to Third Amended Complaint and Counterclaims (*3M Company and 3M Innovative Properties Company* v. *Moldex-Metric, Inc.*, Civil Action No. 03-5292 MJD/JGL, United States District Court for the District of Minnesota).

Moldex's Revised Prior Art Statement of Feb. 21, 2006.

Sample of Moldex 2300 Series Respiratory Mask.

* cited by examiner

UNI-DIRECTIONAL FLUID VALVE

Matter enclosed in heavy brackets [ ] appears in the original patent but forms no part of this reissue specification; matter printed in italics indicates the additions made by reissue.

*CROSS-REFERENCE TO RELATED APPLICATIONS*

*More than one reissue application has been filed from originally issued U.S. Pat. No. 5,687,767. This reissue application is a continuation of U.S. patent application Ser. No. 09/442,082, filed on Nov. 15, 1999 now U.S. Pat. No. Re. 37,974.*

BACKGROUND OF THE INVENTION

The present invention relates to a uni-directional fluid valve which may in particular be used as an exhalation valve for a filter mask. By a "filter mask" we mean a device adapted to be worn over the nose and mouth of a user and made from or incorporating a filter material to remove one or more unwanted components from the inspired air. To improve the comfort and efficiency of such devices it is common to provide a uni-directional exhalation valve on the mask which opens under the pressure differential consequent upon exhalation of the user to allow for a relatively unrestricted flow of exhalate out of the mask, but which closes under other conditions. Examples of valved filter masks are shown in GB-2072516, DE-4029939, U.S. Pat. No. 4,414,973, U.S. Pat. No, 4,838,262, U.S. Pat. No. 4,873,972, U.S. Pat. No. 4,934,362, U.S. Pat. No. 4,958,633, U.S. Pat. No. 4,974,586, U.S. Pat. No. 4,981,134 and U.S. Pat. No. 5,325,892.

A common type of exhalation valve comprises a circular diaphragm of e.g. silicone rubber and a cooperating circular valve seat surrounding the orifice which passes the user's exhalate. The diaphragm is clamped at its centre and marginal portions flex away from the seat when the user exhales. In another known type the diaphragm is in the form of a flexible flap which is attached to a cooperating seat structure at one end, that is to say in cantilever fashion, and flexes away from the rest of the seat when the user exhales. In the design of an exhalation valve it is important to maximise the cross-sectional area of the open orifice to allow free flow of exhalate through the valve, and also to minimise the differential air pressure required to open the valve (i.e. the valve "cracking" pressure). Centrally clamped diaphragm valves require a grater force to open them than cantilevered flap type valves of equivalent size because their available "lever arm" is less. Furthermore, the structure of a cantilevered flap type valve, when open, generally presents less of an obstruction to flow than the centrally clamped circular diaphragm type valve, or in other words imposes a smaller pressure drop for a given orifice size. A potential problem which must be addressed in the design of a cantilivered flap valve, however, lies in ensuring that the flap will remain closed in all orientations of the structure while it is not subject to an exhalatory pressure differential. That is to say, while in order to minimise the opening pressure differential of the valve it is desirable to employ a highly flexible flap of minimal thickness, the very flexibility of the flap may mean that if the valve is inverted in use (i.e. orientated with the seat lying above the flap), the flap may droop down from the seat when the user is not exhaling. This is clearly undesirable as it may open a leakage path into the mask for the contaminants which it is intended to exclude.

U.S. Pat. No. 5,325,892 discloses an exhalation valve with a cantilevered flap in which the valve seat has a seal ridge which is curved in the longitudinal direction of the flap, the curvature corresponding to a deformation curve exhibited by the flap when it bends under its own weight (with no pressure differential). In other words the design of that valve recognises that the flap is unable to stay flat when the structure is inverted and matches the configuration of the seat to the curvature of the flap under that condition.

SUMMARY OF THE INVENTION

In accordance will the present invention a uni-directional fluid valve comprises a flexible flap and a cooperating valve seat surrounding an orifice adapted to pass a fluid; the flap being attached to the seat at one end, in cantilever fashion, and being adapted to flex away from other portions of the seat when fluid flows in the permitted direction; and wherein there is a transverse curvature to at least the said one end of the flap whereby to maintain the flap substantially seated in the absence of a pressure differential across it, in any orientation of the valve.

The effect of the transverse curvature of the flap in a valve according to the invention is therefore to stiffen the flap sufficiently to resist any drooping away from the seat when there is no applied pressure differential, even in the inverted orientation of the structure. As soon as the flap is "cracked" by an appropriate pressure differential, however, the free end of the flap will rapidly flex away from the seat and this flexure will progress along the length of the flap to a position determined by the instantaneous rate of fluid flow. At least the root end of the flap, at its position of attachment to the seat, will retain its transverse curvature however, and this will apply a restorative force to the flexed flap, assisting to reseat the flap when the permitted flow of fluid ceases. The stiffening effect of this transverse curvature is therefore to be distinguished from the longitudinal curvature of the flap in U.S. Pat. No. 5,325,892.

The flap for a valve according to the invention may be manufactured to exhibit the requisite transverse curvature in its natural state, e.g. by means of injection moulding or thermoforming. In the preferred embodiment to be described hereinafter, however, the flap as manufactured is flat and its curvature is imparted in use by means of the shaping of the valve structure in which it is mounted.

BRIEF DESCRIPTION OF THE DRAWINGS

The invention will now be more particularly described, by way of example, with reference to the accompanying schematic drawings, in which.

DETAILED DESCRIPTION OF THE PREFERRED EMBODIMENT

Figure 1:
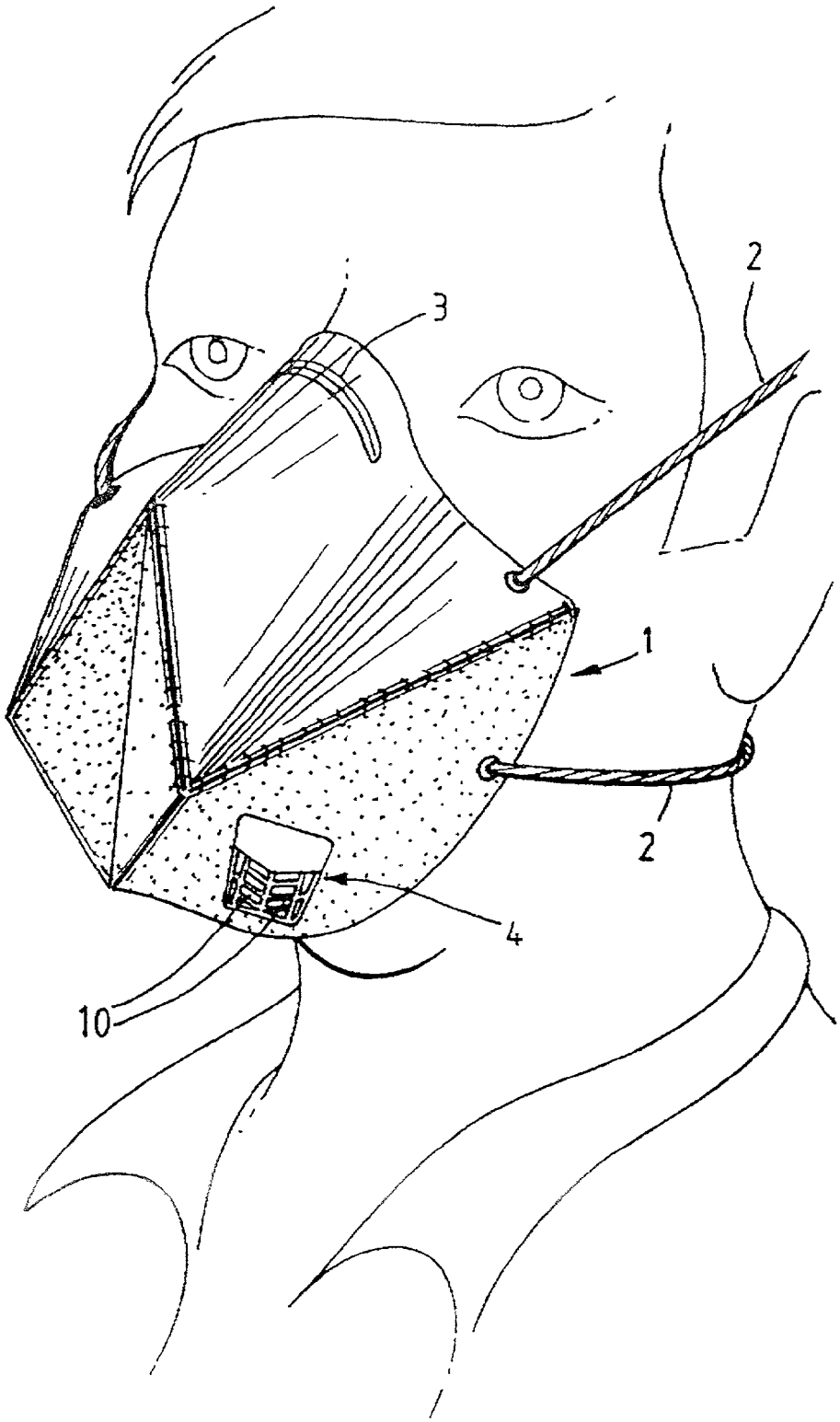
FIG. 1 is a perspective view of a filter mask incorporating a uni-directional valve in accordance with the invention as an exhalation valve.

Referring to FIG. 1, the illustrated mask 1 *includes a mask body that* is made from one or more layers of flexible sheet filter material cut from a blank, folded and welded to form a cup-shaped structure to be worn over the nose and mouth of the user. It is in particular shaped in accordance with the invention in GB-2046102, to which reference is directed for a fuller description of the method of forming the mask from a flat blank. In use the peripheral edge of the mask forms a seal against the wearer's face and it is held in place by elastic headbands 2 and a deformable wire nose clip 3 as well known in the art.

At a suitable location in the side wall of the mask 1 an aperture is formed in which an exhalation valve 4 is fitted, the structure of which is more clearly illustrated in FIGS. 2 to 5.

Figure 2:
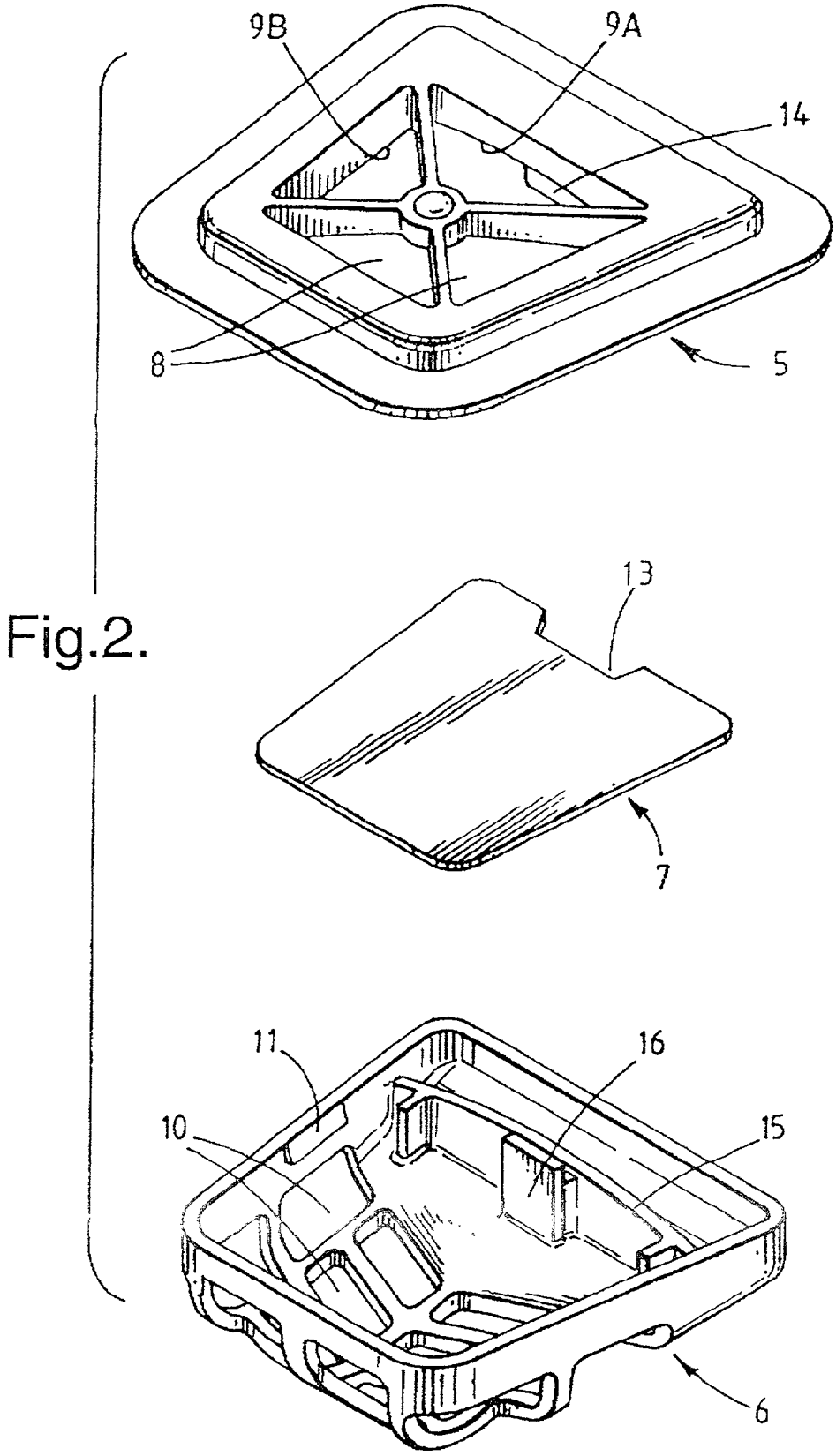
FIG. 2 is an "exploded" isometric view of the components of a preferred embodiment of the exhalation valve for the mask of FIG. 1.

The illustrated valve 4 comprises two interfitting moulded plastics housing members 5 and 6 *that define a valve seat and valve cover, respectively*, and an elastomeric flap 7 which in the assembled valve is trapped at one end between the housing members. The upper housing member *or valve seat* 5 as viewed in FIG. 2 is also seen from its opposite face in FIG. 3. It has inlet ports 8 passing through it which on the downstream side are surrounded by a seal ridge 9A/9B/9C of generally trapezial planform. The lower housing member *or valve cover* 6 as viewed in FIG. 2 is of dished form with a series of outlet ports 10, and snaps onto the member 5 by means of a pair of integral lateral lugs 11 engaging in slots 12 formed in member 5. The flap 7 is of generally trapezial planform sized to fit over the seal ridge and is formed from a thin and highly flexible piece of elastomer, e.g. 0.5 mm thick latex natural rubber having a Shore micro hardness of about 30.

Figure 4:
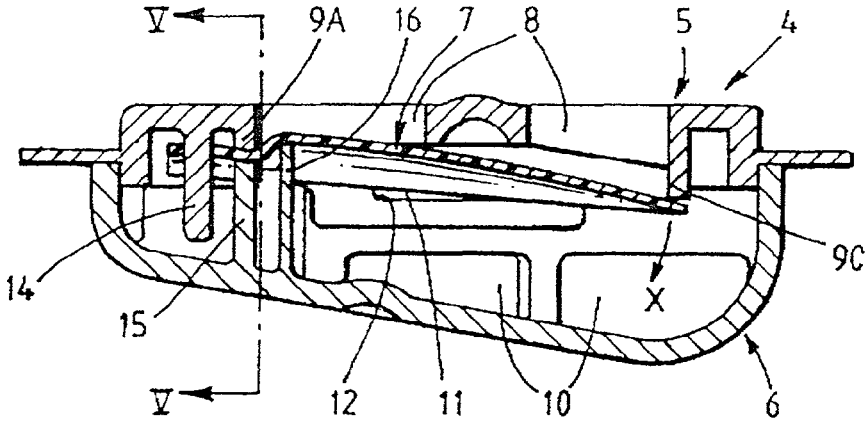
FIG. 4 is a longitudinal section through the valve assembled from the components of FIG. 2, on the line IV-IV of FIG. 5, in the closed condition.
Figure 5:
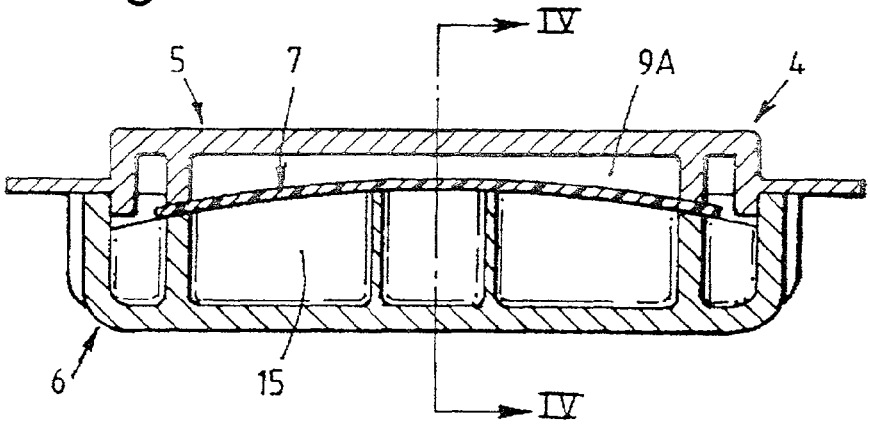
FIG. 5 is a section on the line V-V of FIG. 4.

The flap 7 is positioned in the valve by a notch 13 at one end embracing a block 14 on housing member 5, and when the housing members are snapped together that end of the flap becomes trapped between the adjacent portion 9A of the seal ridge and a profiled block 15 upstanding from housing member 6. That is to say it is mounted in the valve in cantilever fashion. *The flap has a stationary and free portions and a peripheral edge that includes stationary and free segments. The stationary segment of the flap remains stationary during an exhalation, while the free segment is allowed to flex away from the sealing surface.* In its natural state, if the flap 7 is held horizontally at one end it will tend to bow longitudinally under the force of gravity, i.e. so that its opposite end droops down considerably from the plane of its fixed end. Both the block 15 and the facing portion 9A of seal ridge are, however, curved so as to impart to the flap a transversely arched configuration in the assembled valve, as seen particularly in FIGS. 4 and 5. *The seal ridge 9A, 9B, 9C terminates in a seal surface(s) that contacts the flap when the valve is in a closed condition.* In the illustrated embodiment [this] *the* arching is accentuated for the central part of the flap by means of a second profiled block *or member* 16 upstanding from the housing member 6 in front of and to a slightly greater height than the block 15, although this is not essential in all embodiments of the invention. *The second profiled block 16 may engage flap 7 so that a portion of the flap 7 resides in non-alignment with the sealing surface when viewed in a longitudinal section as shown in FIG. 4.* The arching of the flap stiffens it sufficiently to prevent it drooping away from any part of the seal ridge under zero pressure differential conditions, whatever the orientation of the valve. The preferred orientation of the valve is in fact with the outlet ports 10 directed with a downward component, as indicated in FIG. 1, so that the user's exhalate will not mist any associated eyewear, and if the user lowers his head the valve may become oriented with the flap 7 lying wholly below the housing member 5.

In use, therefore, the flap 7 seats upon the seal ridge to prevent the passage of any air into the mask through the valve 4 while the user is not exhaling. At the commencement of exhalation, as soon as a minimum "cracking" pressure differential is applied to the flap 7 from the interior of the mask the free end of the flap will lift away from the seal ridge in the sense of the arrow X in FIG. 4, and flexure of the flap will progress rapidly along its length towards the fixed (root) end, to a position determined by the instantaneous rate of flow of exhalate out through ports 8 and 10. When exhalation ceases, the restorative effect of the arched mounting of the flap will cause the flap as a whole rapidly to reseat upon the seal ridge, to minimise the risk of any inward leakage of contaminant through the valve in the period between the end of exhalation and the commencement of inhalation. In particular, the flap 7 does not depend for its closure upon the subsequent application of an inhalatory pressure differential.

Figure 3:
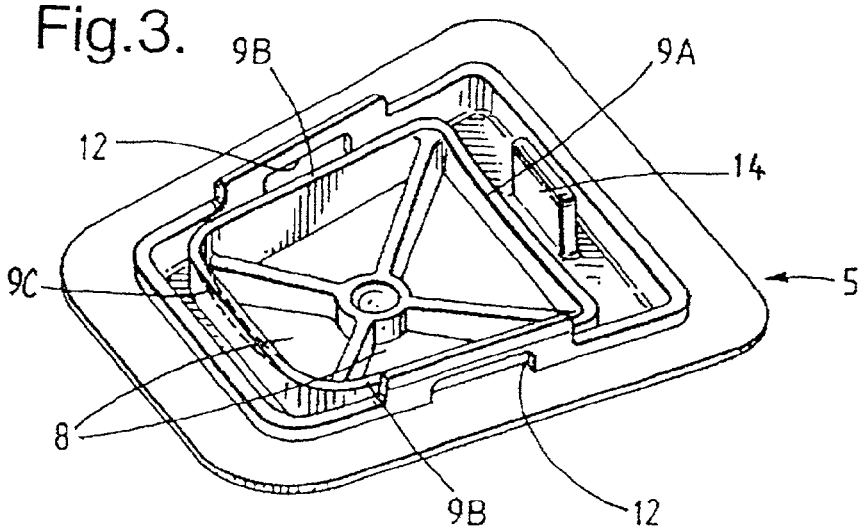
FIG. 3 is an isometric view showing the interior of the upper housing member of FIG. 2.

From FIG. 3 it will be seen that while the portion 9A of the seal ridge at the root end of the flap has a concave curvature the remainder 9B/9C of the ridge has a flat surface. From FIGS. 3 and 4 it will also be seen that the portion 9C of the seal ridge at the free end of the flap rises further from the plane of the member 5 than does the root end portion 9A, and the two side portions 9B are straight but inclined as viewed in elevation. The combined effect of this configuration is that the transverse curvature of the flap 7 decreases towards its free end, which lies flat against seal ridge portion 9C, while a degree of longitudinal curvature is also imparted to the central section of the flap (but not to its side edges which lie flat against the ridge portions 9B). This has been found to enhance the stability of the flap in its closed condition while minimising the opening pressure differential for the particular embodiment illustrated. In other embodiments, however, there may be no longitudinal curvature of the flap and/or its transverse curvature may extend throughout its whole length, in the latter case the seal ridge portion 9C being modified to a concave form as indicated in broken line in FIG. 3.

I claim:

[1. A uni-directional fluid valve comprising a cantilevered flexible flap and a cooperating valve seat surrounding a valve orifice; the cantilevered flexible flap having a planform defining a root end and a free end at opposite ends of a longitudinal axis of the flap, and two peripheral side edges respectively extending between the root end and the free end; the valve seat having sealing surfaces that contact the flap along said root end, free end and peripheral side edges when the fluid valve is closed; the cantilevered flexible flap is attached to the respective sealing surface of the valve seat at said root end and is freely movable to flex away from the respective sealing surfaces of the valve seat at said free end and along at least portions of said peripheral side edges when fluid flows through the fluid valve and the fluid valve is open; and said root end of the cantilevered flexible flap and the respective sealing surface that contacts the cantilevered flexible flap at said root end have a fixed curvature in a direction transverse to said longitudinal axis, said transverse curvature biases the flap and maintains it substantially in contact with all said sealing surfaces of the valve seat in the absence of an opening pressure differential across the flap, in any orientation of the valve.]

[2. A valve according to claim 1 wherein the cantilevered flexible flap exhibits said curvature in its natural state.]

[3. A valve according to claim 1 wherein said curvature is imparted to the cantilevered flexible flap by virtue of its mounting on the valve seat.]

[4. A valve according to claim 3 wherein the cantilevered flexible flap is trapped at said root end between confronting respectively concave and convex surfaces of first and second structural members, said concave surface comprising a said sealing surface of said valve seat.]

[5. A valve according to claim 4 wherein said second structural member presents a further surface in contact with a central portion of the cantilevered flexible flap adjacent to said root end to accentuate the curvature thereof.]

[6. A valve according to claim 1 wherein the respective said sealing surface of the valve seat which the free end of the cantilevered flexible flap contacts is substantially flat.]

[7. A valve according to claim 1 wherein the respective said sealing surface of the valve seat which the free end of the cantilevered flexible flap contacts is of concave curvature.]

[8. A valve according to claim 1 wherein the respective said sealing surfaces of the valve seat which the peripheral side edges of the cantilevered flexible flap contact are substantially flat.]

[9. A valve according to claim 1 wherein the mounting of the cantilevered flexible flap in the valve seat imparts a longitudinal curvature to the central section of the cantilevered flexible flap.]

[10. A filter mask having an exhalation valve comprising a cantilevered flexible flap and a cooperating valve seat surrounding a valve orifice; the cantilevered flexible flap having a planform defining a root end and a free end at opposite ends of a longitudinal axis of the cantilevered flexible flap, and two peripheral side edges respectively extending between the root end and the free end; the valve seat having sealing surfaces that contact the cantilevered flexible flap along said root end, free end and peripheral side edges when the exhalation valve is closed; the cantilevered flexible flap is attached to the respective sealing surface of the valve seat at said root end and is freely movable to flex away from the respective sealing surfaces of the valve seat at said free end and along at least portions of said peripheral side edges when a user of the filter mask exhales and causes the exhalation valve to open; and said root end of the cantilevered flexible flap and the respective sealing surface that contacts the cantilevered flexible flap at said root end have a fixed curvature in a direction transverse to said longitudinal axis, said transverse curvature biases the flap and maintains it substantially in contact with all said sealing surfaces of the valve seat in the absence of an exhalatory pressure differential across the flap, in any orientation of the valve.]

[11. A filter mask according to claim 10 wherein the exhalation valve is so located that during normal head movements of a wearer the cantilevered flexible flap will lie below the valve seat.]

*12. An exhalation permitting filter mask assembly for positioning over the mouth and nose of a user, the filter mask assembly comprising:*

*a mask configured to fit over the nose and mouth of a user and including filter material through which air can be inhaled by a user while effecting filtration of the inhaled air;*

*a uni-directional valve mounted to the mask for permitting exhalation through the valve while precluding inhalation through the valve;*

*the valve including a flexible flap having a root end portion, opposite side portions and a free end portion, an upper housing member, an inlet port and a valve seat surrounding the inlet port and being part of the upper housing member and including a sealing surface adjacent the inlet port;*

*the valve further including a lower housing member that includes a flap-engaging member;*

*the flexible flap being fixedly mounted at the root end portion relative to the upper housing member in a manner so that the free end portion makes sealing contact with the sealing surface when the flexible flap is closed and so that the free end portion of the flexible flap lifts from contact with the sealing surface and moves outwardly of the sealing surface when exhaled air passes through the inlet port; and*

*the flexible flap having a transverse curvature extending medially of the flap imparting sufficient stiffening to the flexible flap to maintain the flexible flap in sealing contact with the sealing surface for any orientation of the filter mask during normal operating conditions in the absence of a pressure differential across the flexible flap*

*wherein the transverse curvature is imparted to the flexible flap by having the flap-engaging member contact the root end portion of the flexible flap such that the flap is held against the sealing surface of the upper housing member and such that a portion of the flap resides in non-alignment with the sealing surface of the upper housing member when the valve is viewed in a longitudinal section (FIG. 4).*

*13. A filter mask assembly as recited in claim 12, wherein the flexible flap is formed of elastomeric material.*

*14. A filter mask assembly as recited in claim 12, wherein the lower housing member faces the upper housing member, and wherein the root end portion of the flexible flap is trapped and fixedly positioned between facing surfaces of the upper housing member and the lower housing member.*

*15. A filter mask assembly as recited in claim 14, wherein the facing surface of the lower housing member is a curved surface.*

*16. A filter mask assembly as recited in claim 14, wherein that part of the sealing surface of the valve seat which the free end portion of the flexible flap contacts is a flat surface.*

*17. A filter mask assembly as recited in claim 14, wherein the sealing surface is provided on a portion of a seal ridge surrounding the inlet port.*

*18. A filter mask assembly as recited in claim 17, wherein the seal ridge comprises four linear seal ridge members and the facing surface on the lower housing is provided on a profiled block aligned with one of the linear seal ridge members.*

*19. A filter mask assembly as recited in claim 18, additionally including a second profiled block provided in the lower housing member engaging a central portion of the flexible flap outwardly of the root end portion to urge the central portion toward the upper housing to enhance the transverse curvature of the flexible flap.*

*20. A filter mask as recited in claim 12, wherein the filter material comprises at least one sheet incorporating filter material.*

*21. A filter face mask that comprises:*

*a mask body adapted to fit over a nose and mouth of a wearer for filtering inhalation air; and*

*an exhalation valve mounted to the mask body, the exhalation valve including a flexible flap, a first housing defining a valve seat and including a seal ridge terminating in a seal surface, and a second housing defining a valve cover;*

*the first housing including one or more inlet ports, the one or more inlet ports being surrounded by the seal ridge;*

*the second housing including one or more outlet ports and being joined to the first housing;*

*the flexible flap having only one stationary portion and only one free portion and a peripheral edge that includes both stationary and free segments, the flap also having a*

*longitudinal axis extending in a direction between the free and stationary segments of the flap;*

*the stationary portion of the flexible flap being held in a stationary position with a first portion thereof in contact with a portion of the seal ridge such that the stationary segment of the peripheral edge remains stationary during exhalation, and the free portion of the flap being movable during exhalation such that the free segment of the peripheral edge moves away from the seal surface and the free portion of the flap lifts off of the seal surface; and*

*the flexible flap having a curvature in a direction transverse to the longitudinal axis, the transverse curvature being imparted to the flexible flap by the mounting of the flexible flap in contact with a portion of the seal ridge, the mounting of the flap causing the stationary portion of the flap to be pressed towards the seal ridge such that a second portion of the stationary portion resides in non-alignment with the seal surface when viewing the valve in a longitudinal section (FIG. 4); the transverse curvature effecting biasing of the free portion of the flexible flap towards the seal surface under neutral conditions so that the flap maintains substantial contact with the seal surface of the valve seat in the absence of exhalatory pressure differential across the flap in any orientation of the valve, while also allowing the free portion of the flexible flap to be lifted from the seal surface during an exhalation.*

*22. The filter face mask of claim 21, wherein the flexible flap is mounted to the valve in cantilever manner by being trapped between respective surfaces on the valve seat and the valve cover.*

*23. The filter face mask of claim 21, wherein the outlet ports are oriented on the valve cover relative to the flexing of the flexible flap such that exhaled air from a wearer exits the exhalation valve with a downward component that directs the exhalate away from a wearer's eyes.*

*24. The filter face mask of claim 21, wherein the seal surface has multiple portions that include first and second side portions and a free-end portion, the free segment of the peripheral edge of the flexible flap having a flat configuration above the first and second side portions and the free end portion.*

*25. The filter face mask of claim 21, wherein the flexible flap's transverse curvature progressively decreases towards an outer end of the free portion of the flexible flap.*

*26. The filter face mask of claim 21, wherein the valve seat and valve cover are inter-fitting plastic parts.*

*27. The filter face mask of claim 21, wherein said stationary portion of the flexible flap is permanently configured for embracing a portion of the valve seat.*

*28. A filter face mask that comprises:*

*(a) a mask body that is adapted to fit over a nose and mouth of a wearer; and*

*(b) an exhalation valve that is mounted to the mask body, the exhalation valve comprising a flexible flap, a valve seat, and a valve cover, the valve seat comprising one or more inlet ports, which one or more ports are surrounded by a seal surface, the valve cover comprising one or more outlet ports and being joined to the valve seat, the flexible flap being mounted to the valve seat and having only one stationary portion and only one free portion and a peripheral edge that includes stationary and free segments at opposite ends of a longitudinal axis of the flap, the stationary segment of the flexible flap's peripheral edge being associated with the stationary portion of the flexible flap so as to remain stationary during an exhalation, and the free segment of the flexible flap's peripheral edge being associated with the free portion of the flexible flap so as to be movable during an exhalation, wherein the flexible flap is mounted relative to the longitudinal axis of the flap towards the stationary segment of the flap's peripheral edge, wherein the flexible flap has a transverse curvature in a direction transverse to the longitudinal axis of the flap, the transverse curvature being accomplished at least in part by having a member from the valve cover press against the flap to create sufficient curvature in the flap at a point where the member contacts the flap to cause at least part of the stationary portion to reside in non-alignment with the seal surface when viewing the flap in a longitudinal section (FIG. 4), the transverse curvature of the flexible flap causing a biasing of the free portion of the flexible flap toward the seal surface under neutral conditions while also allowing the free portion of the flexible flap to be lifted from the seal surface during an exhalation.*

*29. The filter face mask of claim 28, wherein the flexible flap is mounted to the valve by being trapped between respective surfaces on the valve seat and the valve cover.*

*30. The filter face mask of claim 28, wherein the outlet ports are oriented on the valve cover relative to the flexing of the flexible flap such that exhaled air from a wearer exits the exhalation valve with a downward component that directs the exhalate away from a wearer's eyes.*

*31. The filter face mask of claim 29, wherein the seal surface has multiple portions that include first and second side portions and a free-end portion, the free segment of the peripheral edge of the flexible flap having a flat configuration above the first and second side portions and the free end portion.*

*32. The filter face mask of claim 31, wherein the flexible flap's transverse curvature decreases towards the free segment of the peripheral edge of the flexible flap.*

*33. The filter face mask of claim 32, wherein the flexible flap lies flat against the seal surface that is disposed beneath the free end of the flexible flap.*

*34. The filter face mask of claim 28, wherein the valve seat and valve cover are inter-fitting plastic parts.*

*35. The filter face mask of claim 28, wherein the stationary portion of the flexible flap is configured for embracing a member on the valve seat.*

*36. The filter face mask of claim 28, wherein the exhalation valve is positioned on the mask body and the flexible flap is positioned on the valve seat such that the free portion of the flap resides below the stationary portion when the mask is worn in its normal upright position over the nose and mouth of the wearer.*

*37. The filter face mask of claim 36, wherein the transverse curvature comprises an arching of the flap in a dimension transverse to a longitudinal dimension of the flap.*

*38. The filter face mask of claim 37, wherein the flexible flap also has a curvature in the longitudinal dimension, which curvature is imparted to a central section of the flap.*

*39. The filter face mask of claim 38, wherein the transverse curvature of the flap decreases in the longitudinal dimension moving from a point where the flap is mounted to the valve seat towards the free segment of the flap's peripheral edge.*

*40. A filter mask that comprises:*

*(a) a mask body that is adapted to fit over the nose and mouth of a person; and*

*(b) a unidirectional exhalation valve that is mounted to the mask body to enable exhaled air to exit an interior of the mask body during an exhalation, the unidirectional exhalation valve comprising:*

(i) *a cantilevered flexible flap that has a stationary portion and a free portion and has a peripheral edge that includes opposing first and second side edges and opposing stationary and free edges, the stationary and free edges being located at opposing ends of a longitudinal axis of the flap, the first and second peripheral side edges extending between the stationary edge and the free edge,*

(ii) *a valve seat having sealing surfaces that contact the cantilevered flexible flap along the stationary and free edges and first and second side edges when the valve is closed; and*

(iii) *a valve cover that has a profiled block that engages the flexible flap at the stationary portion to press the flap towards the valve seat, wherein the flexible flap exhibits a curvature at least in a direction transverse to the longitudinal axis, the transverse curvature biasing the flap and maintaining the flap in substantially in contact with all the sealing surfaces of the valve seat in the absence of an opening pressure differential across the valve, under any orientation of the valve while also allowing the free edge and at least portions of the peripheral side edges to flex away from the respective sealing surfaces of the valve seat during an exhalation.*

*41. The filter mask of claim 40, wherein the profiled block engages the flap at a non-central location of the flap in a non-aligned relationship to the sealing surfaces, and wherein the transverse curvature of the flap decreases along the longitudinal axis in a direction going from the location where the profiled block engages the flap towards the free segment of the flap's peripheral edge, and wherein the flap is trapped between respective surfaces on the profiled block and on the valve seat.*

*42. The filter mask of claim 41, wherein the sealing surfaces have multiple portions that include first and second side portions and a free end portion, the free segment of the peripheral edge of the flexible flap having a flat configuration above the first and second side portions and the free end portion.*

*43. A filter mask that comprises:*

(a) *a mask body; and*

(b) *a unidirectional exhalation valve that is secured to the mask body, the unidirectional exhalation valve comprising:*

(i) *a flexible flap that has only one stationary portion and only one free portion and that has a peripheral edge that includes a stationary segment and a free segment, the stationary segment being associated with the stationary portion of the flap so as to remain stationary during an exhalation and the free segment of the flap being associated with the free portion of the flap so as to be moveable during an exhalation, the stationary and free segments of the peripheral edge being disposed at opposing ends of a longitudinal dimension of the flap;*

(ii) *a valve seat that has at least one port to allow exhaled air to exit the mask body when worn on a person, the valve seat also comprising a seal surface onto which the stationary and free portions of the flap make contact when no fluid is passing through the port(s), the free portion of the flap being capable of being lifted from the seal surface when a wearer exhales to allow exhalate to exit the mask, the seal surface surrounding the port(s) so that when the stationary and free portions of the flap are in contact with the seal surface fluid cannot pass through the port(s) in an opposite direction to enter the mask, the flexible flap having a fixed curvature in the flap in a direction transverse to the longitudinal dimension, the fixed curvature being assisted in part by exerting a force on the flexible flap to move the flap towards the valve seat such that the flap, at the location where the force is exerted, is non-aligned with the seal surface, wherein the force and the fixed curvature bias the flap towards the seal surface to enable the free portion of the flap to maintain substantial contact with the seal surface under any orientation of the mask when a fluid is not passing through the valve seat port(s).*

*44. The filter face mask of claim 43, further comprising a valve cover that has a profiled block extending therefrom, the profiled block engaging the flap so as to create the force.*

*45. The filter face mask of claim 43, wherein the fixed curvature in a direction transverse to the longitudinal dimension decreases along the longitudinal axis in a direction going from the location where a profiled block engages the flap towards the free segment of the flap's peripheral edge, and wherein the flap is trapped between respective surfaces on the profiled block and on the valve seat.*

*46. A filter mask that comprises:*

(a) *a mask body; and*

(b) *a unidirectional exhalation valve that is secured to the mask body, the unidirectional exhalation valve comprising:*

(i) *a flexible flap that has a stationary portion and a free portion and that has a peripheral edge that includes a stationary segment and a free segment, the stationary segment being associated with the stationary portion of the flap so as to remain stationary during an exhalation and the free segment of the flap being associated with the free portion of the flap so as to be moveable during an exhalation, the stationary and free segments of the peripheral edge being disposed at opposing ends of a longitudinal dimension of the flap;*

(ii) *a valve seat that has at least one port to allow exhaled air to exit the mask body when worn on a person, the valve seat also comprising a seal surface onto which the stationary and free portions of the flap make contact when no fluid is passing through the port(s), the free portion of the flap being capable of being lifted from the seal surface when a wearer exhales to allow exhalate to exit the mask, the seal surface surrounding the port(s) so that when the stationary and free portions of the flap are in contact with the seal surface fluid cannot pass through the port(s) in an opposite direction to enter the mask, the flexible flap being mounted to the valve seat in a cantilevered manner, wherein the flap comprises a fixed curvature in a direction transverse to the longitudinal dimension, the fixed curvature being accentuated by exerting a force on the flexible flap to move the flap towards the valve seat such that the flap, at the location where the force is exerted, is non-aligned with the seal surface, wherein the fixed curvature and the force bias the flap towards the seal surface to enable the free portion of the flap to maintain substantial contact with the seal surface under any orientation of the mask when a fluid is not passing through the valve seat port(s).*

*47. The filter face mask of claim 46, further comprising a valve cover that has a profiled block extending therefrom, the profiled block engaging the flap so as to create the force.*

*48. The filter mask of claim 46, wherein the flap's peripheral edge has two peripheral side edges located between a*

*stationary end and a free end, wherein the free end and at least portions of the peripheral side edges are freely movable to flex away from portions of the seal surface that the flap would contact when in a closed condition.*

*49. A filter mask that comprises:*

*a mask body that is adapted to fit over the nose and mouth of a person; and*

*a unidirectional exhalation valve that is mounted to the mask body to enable exhaled air to exit an interior of the mask body during an exhalation, the exhalation defining a downstream direction and an opposite upstream direction, the unidirectional exhalation valve comprising:*

*a cantilevered flexible flap and a cooperating valve seat surrounding a valve orifice;*

*the cantilevered flexible flap defining a root end and a free end at opposite ends of a longitudinal axis of the flap, and two peripheral side edges respectively extending between the root end and the free end; wherein the root end, the free end, and the two side edges include upstream and downstream surfaces;*

*the valve seat having sealing surfaces that contact the flap along portions of the upstream surface of the root end, the free end, and the peripheral side edges when the fluid valve is closed;*

*the cantilevered flexible flap being mounted in contact with the respective sealing surface of the valve seat at the root end and being freely movable to flex away from the respective sealing surface of the valve seat at the free end and along at least portions of the peripheral side edges when fluid flows through the fluid valve and the fluid valve is open; and*

*wherein the flexible flap comprises a fixed curvature in a direction transverse to the longitudinal axis, the fixed curvature resulting at least in part from a force being applied to the flap at a position proximate the root end and between the peripheral side edges, the applied force moving the flap upstream at the applied position and thus at least partially imparting the curvature, the curvature resulting in maintaining the flap substantially in contact with the sealing surfaces of the valve seat in the absence of an opening pressure differential across the flap, in any orientation of the valve; and*

*further comprising a valve cover having a block for mounting the flap in contact with the sealing surfaces; wherein the block exerts the force in the upstream direction and wherein the transverse curvature in the flap includes a fixed transverse curvature in the flap in said root end at a location of said root end located between the block and the portion of the of the root end that contacts the sealing surface, and wherein the block has a width that is less than a transverse distance between opposite side edges of the orifice.*

*50. The mask of claim 49, wherein the transverse curvature in the flap includes a fixed transverse curvature in the root end of the flap at a location spaced inward from the portion of the root end that contacts the sealing surface.*

*51. The mask of claim 49, wherein said cantilevered arrangement of said flexible flap is defined by the flap being supported proximate said root end and the free end being unsupported.*

*52. The mask of claim 49, wherein said cantilevered arrangement of the flexible flap is defined by said flap being supported by at least said block at or adjacent said root end, and by the free end being unsupported.*

*53. The mask of claim 49, wherein said cantilevered arrangement of the flexible flap is defined by said flap being supported between said block and the sealing surfaces at the root end, and by the free end being unsupported.*

*54. The mask of claim 49, wherein the root end includes an outer edge surface, and wherein the sealing surface contacts the root end inward from the outer edge surface.*

*55. A filter mask that comprises:*

*a mask body that is adapted to fit over the nose and mouth of a person; and*

*a unidirectional exhalation valve that is mounted to the mask body to enable exhaled air to exit an interior of the mask body during an exhalation, the exhalation defining a downstream direction and an opposite upstream direction, the unidirectional exhalation valve comprising:*

*a cantilevered flexible flap and a cooperating valve seat surrounding a valve orifice;*

*the cantilevered flexible flap defining a root end and a free end at opposite ends of a longitudinal axis of the flap, and two peripheral side edges respectively extending between the root end and the free end; wherein the root end, the free end, and the two side edges have upper and lower surfaces;*

*the valve seat having sealing surfaces that contact the flap along portions of the upstream surface of the root end, the free end, and the peripheral side edges when the fluid valve is closed;*

*the cantilevered flexible flap being mounted in contact with the respective sealing surface of the valve seat at the root end and being freely movable to flex away from the respective sealing surface of the valve seat at the free end and along at least portions of the peripheral side edges when fluid flows through the fluid valve and the fluid valve is open; and*

*wherein the flexible flap comprises a fixed curvature in a direction transverse to the longitudinal axis, the fixed curvature resulting at least in part from a force being applied to said flap in an upstream direction at a position proximate the root end and between the peripheral side edges, the applied force moving the flap upstream at the applied position and thus at least partially imparting the curvature, the curvature resulting in maintaining the flap substantially in contact with the sealing surfaces of the valve seat in the absence of an opening pressure differential across the flap, in any orientation of the valve;*

*wherein the transverse curvature in the flap includes a fixed transverse curvature in the root end of the flap at a location spaced inward from the portion of the root end that contacts the sealing surface;*

*wherein the cantilevered arrangement of the flexible flap is defined by said flap being supported proximate the root end, and by said free end being unsupported; and*

*further comprising a valve cover having a block for mounting said flap in contact with said sealing surfaces, wherein the block exerts the force in the upstream direction, wherein the transverse curvature in the flap includes a fixed transverse curvature in the flap in the root end at a portion of the root end located between the block and the portion of the of the root end that contacts the sealing surface, and wherein the block has a width that is less than a transverse distance between opposite side edges of the orifice.*

*56. The mask of claim 55, wherein the cantilevered arrangement of the flexible flap is defined by the flap being supported by at least the block at or adjacent the root end, and by the free end being unsupported.*

*57. The mask of claim 55, wherein the cantilevered arrangement of the flexible flap is defined by the flap being*

*supported between the block and the sealing surfaces at the root end, and by the free end being unsupported.*

*58. The mask of claim 55, wherein the upper surface of the root end includes an outer edge surface, and wherein the sealing surface contacts the root end inward from the outer edge surface.*

*59. A filter mask that comprises:*

*a mask body that is adapted to fit over the nose and mouth of a person; and*

*a unidirectional exhalation valve that is mounted to the mask body to enable exhaled air to exit an interior of the mask body during an exhalation, the exhalation defining a downstream direction and an opposite upstream direction, the unidirectional exhalation valve comprising:*

*a cantilevered flexible flap and a cooperating valve seat surrounding a valve orifice; the cantilevered flexible flap defining a supported end and a free end at opposite ends of a longitudinal axis of the flap, and two peripheral side edges respectively extending between the supported end and the free end; wherein the supported end, the free end, and the two side edges include upstream and downstream surfaces;*

*the valve seat having sealing surfaces that contact the flap along portions of the upstream surfaces of the supported end, the free end, and the peripheral side edges when the fluid valve is closed;*

*the cantilevered flexible flap being mounted in contact with the respective sealing surface of the valve seat at the supported end and being freely movable to flex away from the respective sealing surface of the valve seat at the free end and along at least portions of the peripheral side edges when fluid flows through the fluid valve and the fluid valve is open;*

*a valve cover having a block for mounting the flap in contact with the sealing surfaces; and*

*wherein the flexible flap comprises a fixed curvature in a direction transverse to the longitudinal axis, the fixed curvature at least partially resulting from a force being applied to said flap at a position proximate the supported end and between the peripheral side edges, the block exerting the applied force moving the flap upstream at the position and thus at least partially imparting the curvature, the curvature resulting in a biasing of the flap towards the seal surface to enable the free end of the flap to maintain substantial contact with the sealing surfaces in the absence of an opening pressure differential across the flap, in any orientation of the valve.*

*60. The mask of claim 59, wherein the force is applied at a location spaced inward from the portion of the [of the] supported end that contacts the sealing surface.*

*61. The mask of claim 59, wherein the transverse curvature in the flap includes a fixed transverse curvature in the flap in the supported end between the block and the portion of the of the supported end that contacts the sealing surface.*

*62. The mask of claim 61, wherein the block has a width that is less than a transverse distance between opposite side edges of the orifice.*

*63. The mask of claim 59, wherein the cantilevered arrangement of the flexible flap is defined by the flap being supported at the supported end and the free end being unsupported.*

*64. The mask of claim 59, wherein the cantilevered arrangement of the flexible flap is defined by the flap being supported by at least the block at the supported end, and by the free end being unsupported.*

*65. The mask of claim 59, wherein the cantilevered arrangement of the flexible flap is defined by the flap being supported between the block and the sealing surfaces at the supported end, and by the free end being unsupported.*

*66. The mask of claim 59, wherein the root end includes an outer edge surface, and wherein said sealing surface contacts said supported end inward from the outer edge surface.*

*67. A filter mask that comprises:*

*a mask body that is adapted to fit over the nose and mouth of a person; and*

*a unidirectional exhalation valve that is mounted to the mask body to enable exhaled air to exit an interior of the mask body during an exhalation, the exhalation defining a downstream direction and an opposite upstream direction, the unidirectional exhalation valve comprising:*

*a cantilevered flexible flap and a cooperating valve seat surrounding a valve orifice;*

*the cantilevered flexible flap defining a supported end and a free end at opposite ends of a longitudinal axis of the flap, and two peripheral side edges respectively extending between the supported end and the free end; wherein the supported end, the free end, and the two side edges include upstream and downstream surfaces;*

*the valve seat having sealing surfaces that contact the flap along portions of the upstream surfaces of the supported end, the free end, and the peripheral side edges when the fluid valve is closed;*

*the cantilevered flexible flap being mounted in contact with the respective sealing surface of the valve seat at the supported end and being freely movable to flex away from the respective sealing surface of the valve seat at the free end and along at least portions of the peripheral side edges when fluid flows through the fluid valve and the fluid valve is open; and*

*means for mounting the flexible flap to the valve seat wherein the mounting means creates a fixed curvature in the flap in a direction transverse to the longitudinal axis, the curvature resulting in a biasing of the flap towards the seal surface to enable the free end of the flap to maintain substantial contact with the sealing surfaces in the absence of an opening pressure differential across the flap, in any orientation of the valve;*

*wherein the mounting means includes a block that exerts a force in the upstream direction to the flap's downstream surface at a position proximate the supported end and between the peripheral side edges, the applied force moving the flap upstream at the exerted position and thus at least partially imparting the curvature.*

*68. A filtering face mask that comprises:*

*(a) a mask body that is adapted to fit over the nose and mouth of a person and that includes a layer of filter media; and*

*(b) a unidirectional exhalation valve that is attached to the mask body, which unidirectional exhalation valve comprises:*

*(i) a valve seat that comprises an orifice and a seal surface; and*

*(ii) a single flexible flap that has a stationary portion and only one free portion and a peripheral edge that includes stationary and free segments, the stationary segment of the peripheral edge being associated with the stationary portion of the flexible flap so as to remain in substantially the same position during an exhalation, and the free segment of the peripheral edge being associated with the one free portion of the*

*flexible flap so as to be movable during an exhalation, the single flexible flap also having a longitudinal dimension that is defined by a line extending from the stationary segment of the flap to the free segment;*

*wherein the unidirectional exhalation valve is positioned on the mask body and the single flexible flap is arranged on the valve seat such that the free segment of the peripheral edge is disposed beneath the stationary segment when the mask body is appropriately positioned on a wearer's face, and wherein the flexible flap is mounted on the valve seat non-centrally relative to the valve seat orifice and the longitudinal dimension, there being a force exerted upon the flap in the upstream direction relative to fluid flow through the valve to at least partially impart a curvature to the flap when in a closed position, which curvature extends at least transversely to the longitudinal dimension, the free portion of the flexible flap being in contact with the seal surface when a wearer of the mask is neither inhaling nor exhaling and being free to be lifted from the seal surface during an exhalation.*

*69. The filtering mask of claim 68, wherein the transverse curvature is at least partially imparted to the flexible flap by virtue of its mounting on the valve seat.*

*70. The filtering face mask of claim 69, wherein the flexible flap is trapped between first and second confronting surfaces of first and second structural members, respectively.*

*71. The filtering mask of claim 70, wherein the first structural member is associated with the valve seat and the second structural member is associated with a valve cover.*

*72. The filtering face mask of claim 69, wherein the valve seat surface is substantially flat in a region wherein the free portion of the flap makes contact with the seal surface when the valve is in its closed position.*

*73. The filtering face mask of claim 69, wherein the mounting of the flexible flap with respect to the valve seat also imparts a longitudinal curvature to at least the central section of the flexible flap.*

*74. The filtering face mask of claim 68, wherein the valve seat orifice includes a plurality of ports that are separated by structural members that extend across the orifice.*

* * * * *

UNITED STATES PATENT AND TRADEMARK OFFICE

CERTIFICATE OF CORRECTION

PATENT NO. : RE43,289 E
APPLICATION NO. : 09/986346
DATED : April 3, 2012
INVENTOR(S) : John L Bowers It is certified that error appears in the above-identified patent and that said Letters Patent is hereby corrected as shown below:

Page 2, Column 2, "Other Publications"
Line 2, delete "Innivative" and insert -- Innovative --, therefor.

Column 1
Line 33, delete "No," and insert -- No. --, therefor.
Line 57, delete "cantilivered" and insert -- cantilevered --, therefor.

Column 2
Line 12, delete "will the" and insert -- with the --, therefor.

Column 11
Line 50, in Claim 49, delete "of the of the" and insert -- of the --, therefor.

Column 12
Line 58, in Claim 55, delete "of the of the" and insert -- of the --, therefor.

Column 13
Lines 55-56, in Claim 61, delete "of the of the" and insert -- of the --, therefor.

Signed and Sealed this
Seventeenth Day of July, 2012

David J. Kappos

David J. Kappos
*Director of the United States Patent and Trademark Office*